(12) United States Patent
Dewa et al.

(10) Patent No.: US 9,154,833 B2
(45) Date of Patent: Oct. 6, 2015

(54) INFORMATION PROCESSING APPARATUS, DATA MANAGEMENT METHOD, AND PROGRAM

(75) Inventors: Yoshiharu Dewa, Tokyo (JP); Naohisa Kitazato, Tokyo (JP); Katsunori Hashimoto, Tokyo (JP); Masahito Mori, Kanagawa (JP)

(73) Assignee: Sony Corporation, Tokyo (JP)

( * ) Notice: Subject to any disclaimer, the term of this patent is extended or adjusted under 35 U.S.C. 154(b) by 231 days.

(21) Appl. No.: 13/395,064

(22) PCT Filed: Aug. 31, 2010

(86) PCT No.: PCT/JP2010/005344
§ 371 (c)(1),
(2), (4) Date: Mar. 8, 2012

(87) PCT Pub. No.: WO2011/033730
PCT Pub. Date: Mar. 24, 2011

(65) Prior Publication Data
US 2012/0174170 A1  Jul. 5, 2012

(30) Foreign Application Priority Data

Sep. 15, 2009  (JP) ............................... P2009-213793

(51) Int. Cl.
| H04N 21/44 | (2011.01) |
| H04N 21/472 | (2011.01) |
| H04N 21/236 | (2011.01) |
| H04N 21/434 | (2011.01) |

(52) U.S. Cl.
CPC ... *H04N 21/44016* (2013.01); *H04N 21/23617* (2013.01); *H04N 21/4349* (2013.01); *H04N 21/47202* (2013.01)

(58) Field of Classification Search
None
See application file for complete search history.

(56) References Cited

U.S. PATENT DOCUMENTS

| 2002/0010937 A1* | 1/2002 | Hirai et al. ...................... 725/91 |
| 2007/0154172 A1* | 7/2007 | Watanabe ........................ 386/83 |
| 2008/0063354 A1* | 3/2008 | Kim ................................ 386/46 |

FOREIGN PATENT DOCUMENTS

| WO | WO2007-072670 | 6/2007 |
| WO | WO2007-143933 | 12/2007 |
| WO | WO2008-129858 | 10/2008 |

OTHER PUBLICATIONS

Nov. 5, 2013, JP communication issued for related JP application No. 2009-213793.
Feb. 11, 2014, Chinese Office Action for related CN application No. 201080040008.0.

(Continued)

*Primary Examiner* — Mark D Featherstone
(74) *Attorney, Agent, or Firm* — Sherr & Jiang, PLLC

(57) ABSTRACT

[Object] To realize processing for switching a reproduction state from broadcast data to network data and resuming the reproduction of the original broadcast data.
[Solving Means] A browser (241) acquires, via a network, an XML-AIT having a content equivalent to a broadcast AIT defining a life cycle of a broadcast application while a VoD content is reproduced after being switched from the broadcast application. The browser (241) manages the broadcast application based on the XML-AIT and resumes the reception of the broadcast application after the reproduction of the VoD content is ended. With this structure, processing of separating two transport streams at the same time becomes unnecessary, and one demultiplexer (23) only needs to be provided.

9 Claims, 3 Drawing Sheets

(56) References Cited

OTHER PUBLICATIONS

JTC Broadcast, Digital Video Broadcasting (DVB); Multimedia Home Platform (MHP) Specification 1.1.1, ETSI TS 102 812 v1.2.1, Jun. 2003, p. 52-57, 188-220, and 382.

Sep. 9, 2013, European Search Report for related EP application No. 10816845.1.

JTC Broadcast, Digital Video Broadcasting (DVB); Multimedia Home Platform (MHP) Specification 1.1.1, ETSI TS 102 812 v1.2.1, Jun. 2003, p. 36-67 and 188-246.

ETSI, Hybrid Broadcast Broadband TV, ETSI TS 102 796 v.1.2.1, Nov. 2012, p. 1-88.

Merkel, Hybrid Broadcast Broadband TV, The New Way to a Comprehensive TV Experience, Institut für Rundfunktechnik, Munich, Germany.

Mar. 31, 2015, Japanese Office Action for related JP application No. 2014-043090.

Feb. 17, 2015, Extended European Search Report to related EP application No. 14200003.3.

Feb. 11, 2015, Article 94(3) Communication for related EP application No. 10816845.1.

DVB Organization, "Digital Video Broadcasting (DVB); Signalling and carriage of interactive applications and services in hybrid broadcast/broadband environments", Sep. 9, 2009, p. 1-102, Geneva, Switzerland.

DVB Organization, "Commercial Requirements for Hybrid Broadcast/Broadband Services", Oct. 13, 2006, p. 1-15, Geneva, Switzerland.

* cited by examiner

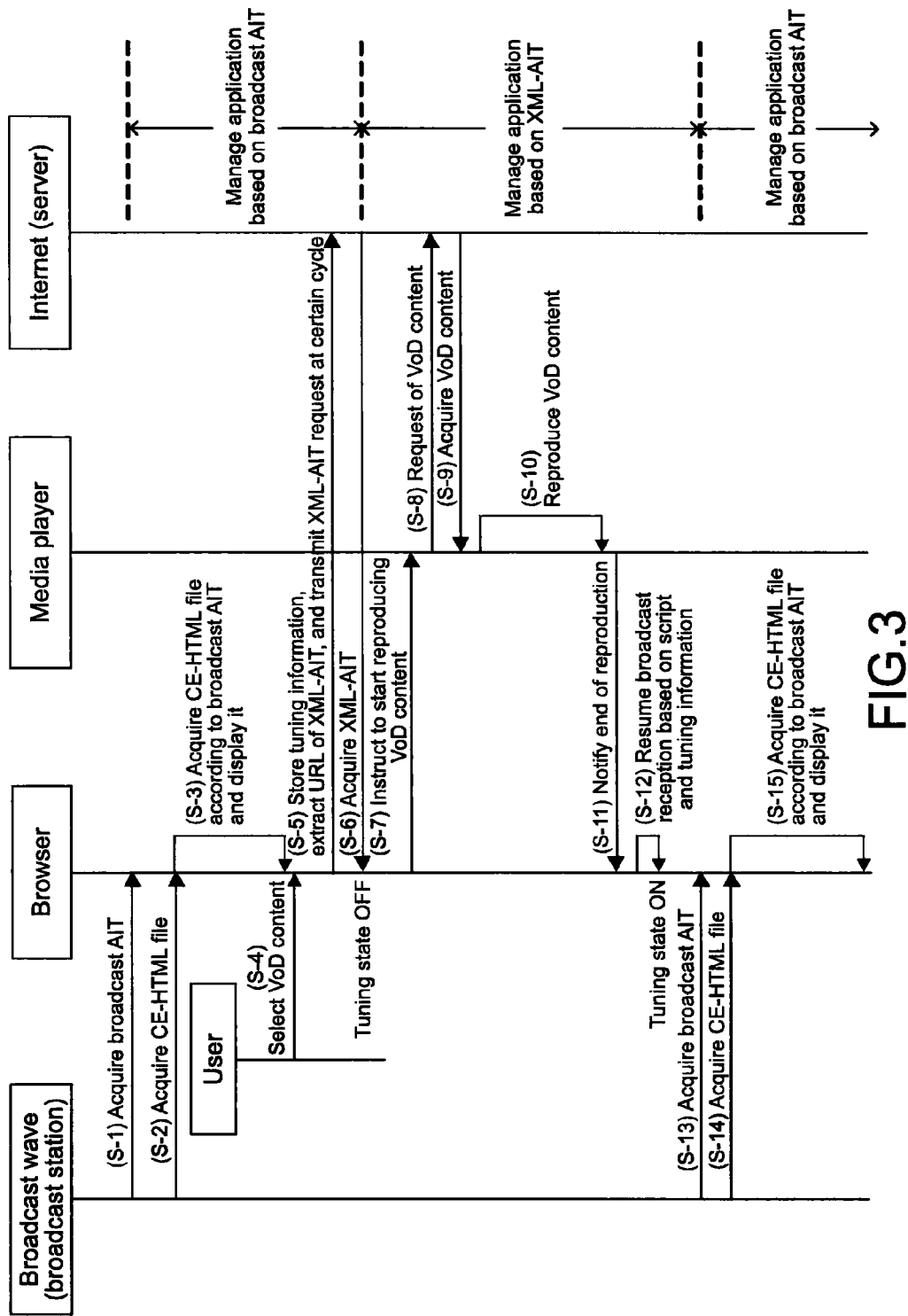

INFORMATION PROCESSING APPARATUS, DATA MANAGEMENT METHOD, AND PROGRAM

TECHNICAL FIELD

The present invention relates to an information processing apparatus capable of receiving data by broadcast and via a network, a data management method that is based on information defining a life cycle of the data, and a program therefor.

BACKGROUND ART

In recent years, a specification called HBBTV (Hybrid Broadcast Broadband TV) in Europe is being discussed. In HBBTV, videos and applications are delivered via transmission media including broadcast and the Internet. Here, the video refers to A/V content data that is to be subjected to reproduction processing by a player of a terminal apparatus, and the application refers to document data, image data, script data, and the like that can be processed by a browser of the terminal apparatus.

In HBBTV, the terminal apparatus acquires a table called AIT (Application Information Table) and manages an application based on control information on a life cycle that is described in the table.

In the AIT, for example, "AUTOSTART", "PRESENT", and "KILL" are described as the control information on a life cycle of an application. "AUTOSTART" means that the terminal apparatus immediately and automatically executes reproduction of an application, "PRESENT" means that the terminal apparatus does not automatically execute the reproduction, and "KILL" means that terminal apparatus stops the reproduction of an application. Based on the control information on a life cycle in the AIT as described above, the terminal apparatus acquires and reproduces an application that has been set to be immediately and automatically reproduced, for example.

Patent Document 1 discloses a technique that uses the AIT as synchronization information of an application program that an information processing apparatus has downloaded.

Patent Document 1: Japanese Patent Application Laid-open No. 2009-94702 (paragraphs [0106]-[0108])

DISCLOSURE OF THE INVENTION

Problems to be Solved by the Invention

The following operations are assumed to occur in the HBBTV-compliant terminal apparatus.

As a user selects a broadcast service, the browser of the terminal apparatus acquires an AIT (hereinafter, referred to as "broadcast AIT") corresponding to the broadcast service as well as reproduce a broadcast video and audio and starts an acquisition and reproduction of an application whose control information in the broadcast AIT is "AUTOSTART". Here, it is assumed that the broadcast application data is CE-HTML data, and a VoD content URL and a GUI that prompts the user to input a reproduction instruction of the VoD content are embedded in the CE-HTML data.

When the user of the terminal apparatus selects a VoD content to view in the GUI, the terminal apparatus acquires a URL of the VoD content from the CE-HTML data and accesses the Internet based on the URL to acquire the VoD content. Then, the terminal apparatus starts reproducing the acquired VoD content. When the reproduction of the VoD content is ended or interrupted, reproduction of the broadcast video and audio is resumed as well as automatically restored to the reproduction of an application that is being broadcasted from a previously-selected broadcast station.

However, to restore to the reproduction state of the original broadcast application as described above, it is necessary to continue monitoring the broadcast AIT even during the reproduction of the VoD content to grasp a life cycle of the broadcast application. Specifically, since the content of the AIT changes with time, the terminal apparatus needs to periodically acquire the latest broadcast AIT.

To continue monitoring the broadcast AIT even during the reproduction of the VoD content, separation processing for a transport stream of a VoD content and separation processing for a broadcast transport stream need to be carried out at the same time in the terminal apparatus. Therefore, it is structurally essential to mount two demultiplexers that can be operated at the same time in the terminal apparatus, with the result that a hardware scale of the terminal apparatus increases.

In view of the circumstances as described above, it is an object of the present invention to provide an information processing apparatus, a data management method, and a program that are capable of realizing processing for switching a reproduction state of broadcast data to a reproduction state of network data and then restoring to the reproduction state of the original broadcast data without mounting a plurality of demultiplexers, and with which a hardware scale can be made small.

Means for Solving the Problems

To attain the object above, according to an embodiment of the present invention, there is provided an information processing apparatus including: a first management unit to acquire, by broadcast, first definition information that defines a life cycle of first application data transmitted with first video data and manage the first application data delivered by broadcast or via a network based on the first definition information; and a second data management unit to acquire, via the network, while second video data is acquired and reproduced via the network after the first video data is switched from a reproduction state, description information including second definition information equivalent to the first definition information and manage the first application data based on the second definition information included in the description information.

In the present invention, the first video data and the first definition information are transmitted by broadcast as sections of a transport stream, and the second video data is similarly transmitted as a transport stream via the network. When separation processing needs to be carried out by a demultiplexer after receptions of the data, the second data management unit acquires, via the network, the description information including the second definition information equivalent to the first definition information while the demultiplexer is used for acquiring and reproducing the second video data via the network. As a result, the processing for switching a reproduction state of broadcast data to a reproduction state of network data and then restoring to the reproduction state of the original broadcast data can be realized with a single demultiplexer.

The second data management unit turns off a reception state of the first data based on the description information including the second definition information. As a result, the state where the first application data is managed based on the first definition information can be switched to the state where the first application data is managed based on the second definition information.

The second data management unit resumes the reception of the first video data as the reproduction of the second video data ends. With this structure, after the reproduction of the second video data is ended, the state where the first application data is managed based on the second definition information can be restored to the state where the first application data is managed based on the first definition information.

The second data management unit may acquire the second definition information based on information that is included in the first application data and indicates a location of the second definition information in the network.

The second data management unit may resume the reception of the first video data according to a description on a processing procedure included in the first application data.

According to another embodiment of the present invention, there is provided a data management method including: acquiring by broadcast, by a first management unit, first definition information that defines a life cycle of first application data transmitted with first video data and managing the first application data delivered by broadcast or via a network based on the first definition information; and acquiring via the network, by a second data management unit, while second video data is acquired and reproduced via the network after the first video data is switched from a reproduction state, description information including second definition information equivalent to the first definition information and managing the first application data based on the second definition information included in the description information.

According to another embodiment of the present invention, there is provided a program causing a computer to function as: a first management unit to acquire, by broadcast, first definition information that defines a life cycle of first application data transmitted with first video data and manage the first application data delivered by broadcast or via a network based on the first definition information; and a second data management unit to acquire, via the network, while second video data is acquired and reproduced via the network after the first video data is switched from a reproduction state, description information including second definition information equivalent to the first definition information and manage the first application data based on the second definition information included in the description information.

Effect of the Invention

As described above, according to the present invention, the processing for switching the reproduction state of broadcast data to the reproduction state of network data and then restoring to the reproduction state of the original broadcast data can be realized without mounting a plurality of demultiplexers, and a hardware scale can be made small.

BRIEF DESCRIPTION OF DRAWINGS

[FIG. 3] A sequence diagram showing operations of this embodiment.

BEST MODE FOR CARRYING OUT THE INVENTION

Hereinafter, an embodiment of the present invention will be described with reference to the drawings.

<First Embodiment>

Figure 1:
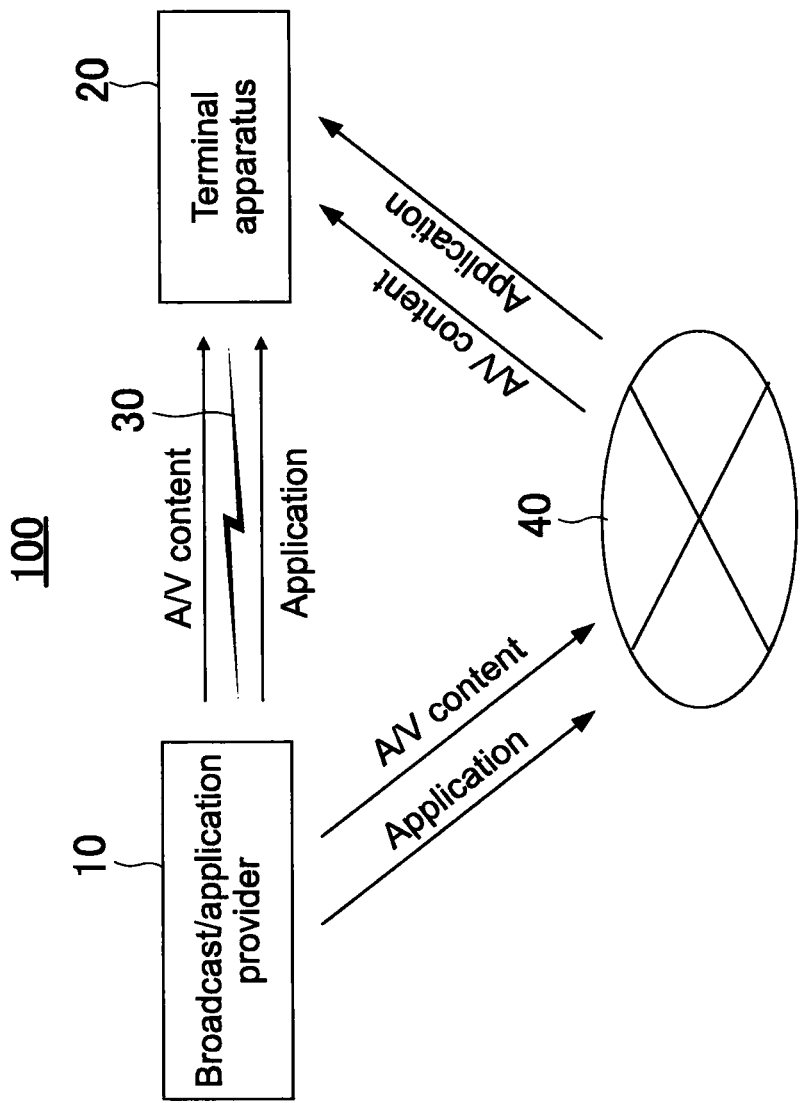
[FIG. 1] A diagram showing a structure of a data communication system according to an embodiment of the present invention.

FIG. 1 is a diagram showing a structure of a data communication system according to an embodiment of the present invention.

As shown in the figure, the data communication system 100 is constituted of a broadcast/application provider 10 and a terminal apparatus 20 (information processing apparatus).

The broadcast/application provider 10 delivers videos, applications, and an AIT (Application Information Table) via transmission media such as broadcast 30 and a network 40. The network 40 may either be by wires or wireless. The network 40 may be the Internet. The broadcast/application provider 10 includes, as well as a function as a broadcast station, a server apparatus for delivering videos and applications via the network 40.

The broadcast/application provider 10 is capable of delivering, as well as broadcast the AIT as a broadcast AIT (first definition information), an XML-AIT (description information including second definition information) having a content equivalent to that of the broadcast AIT by the server apparatus in response to a request from the terminal apparatus 20. Here, the video is data of an A/V content (transport stream of MPEG-2/Video etc.) and the like, and the application is document data, image data, script data, and the like. In HBBTV, MPEG-2/Video or the like is adopted as a data format of A/V contents, and CE (Consumer Electronics)-HTML or the like is adopted as a data format of documents.

The terminal apparatus 20 is an electronic apparatus that is capable of receiving videos and applications provided by the broadcast/application provider 10 via the transmission media such as the broadcast 30 and the network 40 and subjecting them to reproduction processing and the like. More specifically, the terminal apparatus 20 is a television, a personal computer, a cellular phone, or the like.

Figure 2:
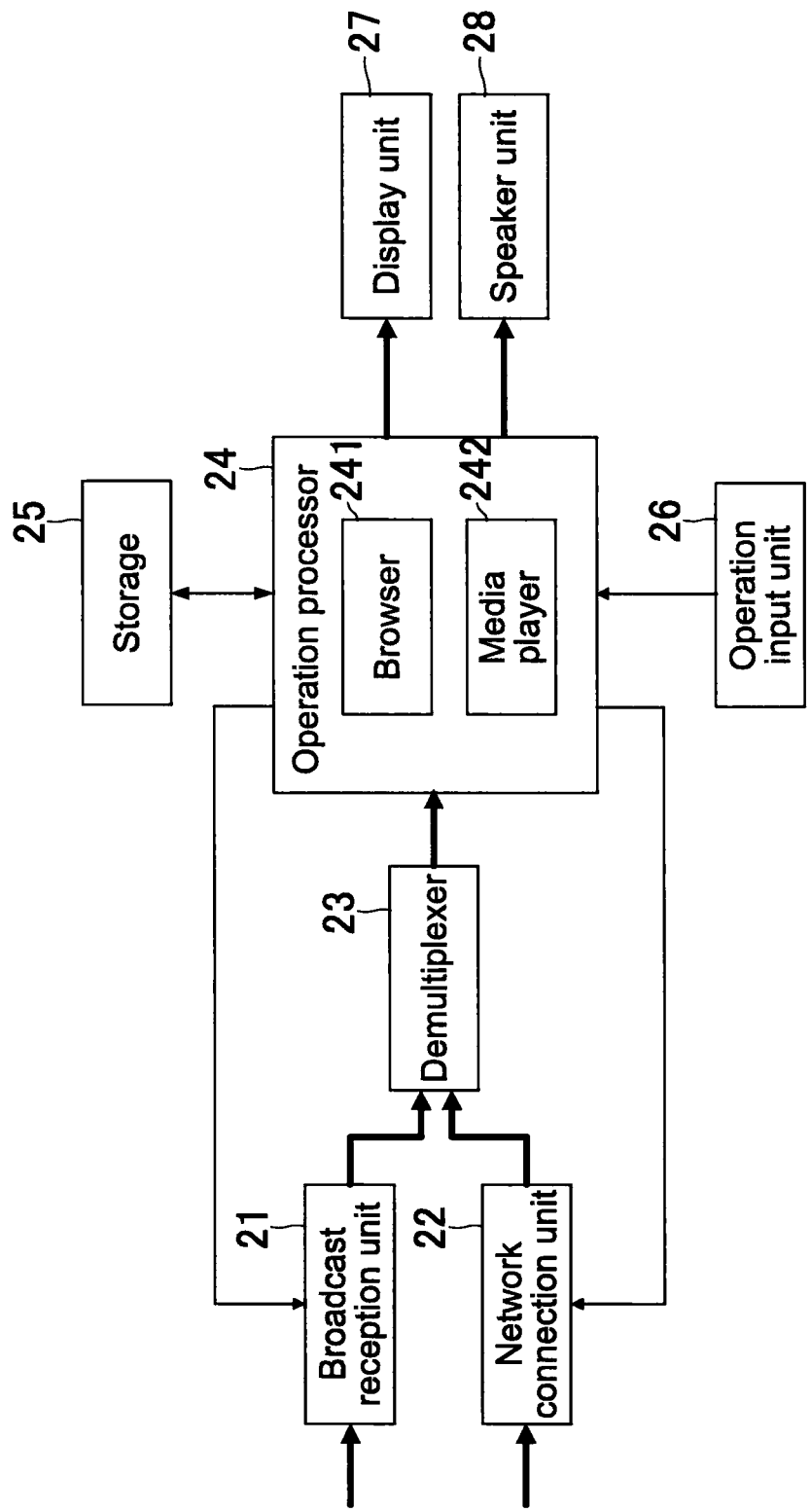
[FIG. 2] A diagram showing a structure of a terminal apparatus of FIG. 1.

FIG. 2 is a diagram showing a structure of the terminal apparatus 20. This example shows a structural diagram in a case where a television is used as the terminal apparatus 20.

As shown in the figure, the terminal apparatus 20 includes a broadcast reception unit 21, a network connection unit 22, a demultiplexer 23, an operation processor 24, a storage 25, an operation input unit 26, a display unit 27, and a speaker unit 28.

The broadcast reception unit 21 receives broadcast videos, applications, and a broadcast AIT as transport streams from the broadcast/application provider 10. The network connection unit 22 is capable of accessing the server apparatus of the broadcast/application provider 10 by processing a connection with respect to the network 40 and receiving videos, applications, and an XML-AIT.

The demultiplexer 23 separates the video, audio, AIT (broadcast AIT, XML-AIT) and the like from the transport streams received by the broadcast reception unit 21 and the network connection unit 22. In this embodiment, only one demultiplexer 23 is mounted, and only one transport stream can be subjected to simultaneous separation processing.

The operation processor 24 includes a CPU (Central Processing Unit), a main memory, and a ROM (Read Only Memory). The main memory or the ROM stores a browser 241 and a media player 242 as software. The browser 241 (first management unit, second management unit) carries out browse processing of documents and images as applications. The media player 242 is software incorporated as a plug-in (additional function) of the browser 241 and caries out reproduction processing of A/V contents.

The storage 25 stores tuning information for identifying a previous broadcast service before a browse state of a broadcast application is switched to reproduction of a VoD content.

The operation input unit 26 receives an input operation from a user and notifies the operation processor 24. The operation input unit 26 may be a key operation unit provided on a main body of the terminal apparatus 20, a remote controller, or the like.

The display unit 27 displays documents and images processed by the browser 241 and also displays videos of A/V contents reproduced by the media player 242. The speaker unit 28 outputs an audio of an A/V content reproduced by the media player 242, for example.

<Explanation of Operation>

Next, an operation of this embodiment will be described while mainly focusing on an operation of the terminal apparatus 20. Here, an operation carried out in a case where a browse state of a broadcast application is switched to a reproduction state of a VoD content and then restored to the browse state of the original broadcast application will be described.

FIG. 3 is a sequence diagram showing operations of this embodiment.

The browser 241 of the terminal apparatus 20 acquires a broadcast AIT of a broadcast station selected by a user (S-1). The acquisition of a broadcast AIT is carried out at a certain time interval.

The browser 241 acquires an application whose control information in the latest broadcast AIT is "AUTOSTART" from applications broadcasted from the broadcast station (S-2) and carries out reproduction processing of the application (S-3). Here, a case where the application is CE-HTML data will be discussed.

The CE-HTML data includes a URL (Uniform Resource Locator) of an XML-AIT defining a life cycle of one or more VoD contents related to a video broadcasted from the broadcast station and GUI (Graphical User Interface) data that is capable of receiving an instruction to select the VoD content from the user. The CE-HTML data also includes a URL of an XML-AIT (description information including second definition information) equivalent to the broadcast AIT (first definition information) defining a life cycle of the application itself, and a script including a function for restoring the tuning state from OFF to ON (setChannel).

Here, although the XML-AIT includes the same control information as the XML-AIT, even when an application is activated based on the XML-AIT, an actual reception state (tuning state) is OFF. In other words, in activating a new application by a createApplication method, the browser 241 turns ON the broadcast tuning state only when org_id, app_id, and protocol_id of transport_protocol_descriptor in the XML-AIT are "3" and a domain name included in an activation URL of the application matches an application domain of the broadcast AIT. Otherwise, by the browser 241 activating broadcast-independent-application, a null service is selected, that is, the tuning state becomes OFF. Therefore, the XML-AIT only needs to be described such that the conditions above are unsatisfied.

Assuming that a VoD content to view has been selected by the user on a browse screen of the CE-HTML data using the operation input unit 26 (S-4), the browser 241 stores tuning information for identifying a currently-selected broadcast service in the storage 25, extracts a URL of the XML-AIT from the CE-HTML data, and transmits an XML-AIT request to the network based on the URL of the XML-AIT (S-5).

After that, the browser 241 acquires the XML-AIT transmitted from the server apparatus of the broadcast/application provider 10 via the network (S-6). Upon acquiring the XML-AIT, the browser 241 activates a new application by the createApplication method so that a null service is selected (tuning state is OFF).

As a result, the demultiplexer 23 that has been used for separating the broadcast transport streams is released. After that, the browser 241 transmits the XML-AIT request to the network 40 at a certain cycle, acquires the latest XML-AIT every time the request is transmitted, and manages the new application based on the control information in the XML-AIT.

After the demultiplexer 23 is released, the browser 241 gives an instruction to start reproducing the VoD content selected by the user to the media player 242 (S-7). In response to the instruction, the media player 242 transmits a VoD content request to the server apparatus of the broadcast/application provider 10 via the network 40 (S-8). Upon acquiring the VoD content (S-9), the media player 242 reproduces it (S-10). In other words, the demultiplexer 23 is used for carrying out separation processing of transport streams of VoD contents.

When the reproduction of the VoD content is ended or interrupted by an instruction from the user, a reproduction end notification is transmitted from the media player 242 to the browser 241 (S-11). The browser 241 stores the CE-HTML data also during the reproduction of the VoD content. Upon receiving the reproduction end notification from the media player 242, the browser 241 restores the previous application before the reproduction of the VoD content and the tuning state and resumes the broadcast reception based on the script that is included in the CE-HTML data and includes the function for restoring the tuning state from OFF to ON (setChannel), the tuning information stored in the storage 25, and the control information in the XML-AIT (S-12).

After that, by resuming the broadcast reception, the browser 241 acquires the broadcast AIT (S-13), acquires application data whose control information in the broadcast AIT is "AUTOSTART" (S-14), and carries out browse processing (S-15).

As described above, in this embodiment, during reproduction of a VoD content switched from reproduction of a broadcast application, the browser 241 acquires, via the network, an XML-AIT having a content equivalent to that of a broadcast AIT defining a life cycle of the broadcast application. The browser 241 manages the broadcast application based on the XML-AIT and restores the reception state of the broadcast application after the reproduction of the VoD content is ended. With this structure, processing for separating two transport streams at the same time becomes unnecessary, and only one demultiplexer 23 needs to be provided.

<Modified Example>

In the first embodiment, the operation carried out in the case where an application (CE-HTML data) is received by the broadcast 30 in S-2 and S-14 has been described. However, the application (CE-HTML data) may be received from the server apparatus of the broadcast/application provider 10 via the network 40. Also in this case, other operations are the same as those of the first embodiment.

Furthermore, the present invention is not limited to HBBTV and is also applicable to other systems for managing data based on information defining a life cycle of the data.

DESCRIPTION OF REFERENCE NUMERALS 10 broadcast/application provider
20 terminal apparatus
21 broadcast reception unit
22 network connection unit
23 demultiplexer
24 operation processor
25 storage 26 operation input unit
27 display unit
28 speaker unit
30 broadcast
40 network
100 data communication system
241 browser
242 media player

The invention claimed is:

1. An information processing apparatus, comprising:
a first management unit configured to acquire by broadcast first definition information, wherein:
the first definition information defines a life cycle of first application data,
the first definition information is transmitted with first video data by the broadcast, and
the first management unit is configured to manage the first application data delivered by the broadcast based on the first definition information; and
a second data management unit configured to acquire via the network description information, wherein:
the description information is acquired while second video data is acquired and the description information comprises second definition information relating to the second video data,
at approximately the same time that the first video data from the broadcast halts a reproduction state and if the first definition information is equivalent to the second definition information, the second video data is reproduced via the network in substitution of the first video data,
the second data management unit is configured to manage the first application data based on the second definition information included in the description information,
the second data management unit turns off a reception state of the first video data based on the description information including the second definition information, and
the second data management unit resumes the reception of the first video data as the reproduction of the second video data ends.

2. The information processing apparatus according to claim 1,
wherein the second data management unit acquires the second definition information based on information that is included in the first application data and indicates a location of the second definition information in the network.

3. The information processing apparatus according to claim 2,
wherein the second data management unit resumes the reception of the first video data according to a description on a processing procedure included in the first application data.

4. A data management method, comprising:
acquiring by broadcast first definition information, wherein:
said acquiring by broadcast is performed by a first management unit,
the first definition information defines a life cycle of first application data,
the first definition information is transmitted with first video data by the broadcast, and
the first management unit is configured to manage the first application data delivered by the broadcast based on the first definition information; and
acquiring via the network description information, wherein:
said acquiring via the network is performed by a second data management unit,
the description information is acquired while second video data is acquired and the description information comprises second definition information relating to the second video data,
at approximately the same time that the first video data from the broadcast halts a reproduction state and if the first definition information is equivalent to the second definition information, the second video data is reproduced via the network in substitution of the first video data,
the second data management unit is configured to manage the first application data based on the second definition information included in the description information,
the second data management unit turns off a reception state of the first video data based on the description information including the second definition information, and
the second data management unit resumes the reception of the first video data as the reproduction of the second video data ends.

5. The data management method according to claim 4,
wherein the second data management unit acquires the second definition information based on information that is included in the first application data and indicates a location of the second definition information in the network.

6. The data management method according to claim 5,
wherein the second data management unit resumes the reception of the first video data according to a description on a processing procedure included in the first application data.

7. A program embodied on a non-transitory storage medium causing a computer to function as:
a first management unit configured to acquire by broadcast first definition information, wherein:
the first definition information defines a life cycle of first application data,
the first definition information is transmitted with first video data by the broadcast, and
the first management unit is configured to manage the first application data delivered by the broadcast based on the first definition information; and
a second data management unit configured to acquire via the network description information, wherein:
the description information is acquired while second video data is acquired and the description information comprises second definition information relating to the second video data,
at approximately the same time that the first video data from the broadcast halts a reproduction state and if the first definition information is equivalent to the second definition information, the second video data is reproduced via the network in substitution of the first video data,
the second data management unit is configured to manage the first application data based on the second definition information included in the description information,
the second data management unit turns off a reception state of the first video data based on the description information including the second definition information, and the second data management unit resumes the reception of the first video data as the reproduction of the second video data ends.

8. The program according to claim 7,
wherein the second data management unit acquires the second definition information based on information that is included in the first application data and indicates a location of the second definition information in the network.

9. The program according to claim 8,
wherein the second data management unit resumes the reception of the first video data according to a description on a processing procedure included in the first application data.

* * * * *